United States Patent
Shah et al.

(10) Patent No.: US 6,898,339 B2
(45) Date of Patent: May 24, 2005

(54) MULTIPLE MODE PRE-LOADABLE FIBER OPTIC PRESSURE AND TEMPERATURE SENSOR

(75) Inventors: Jagdish Shah, Wallingford, CT (US); Robert Schroeder, Newtown, CT (US); Philip Dryden, Danbury, CT (US); Rogerio Ramos, North Baddesley (GB); Raghu Madhavan, Houston, TX (US)

(73) Assignee: Schlumberger Technology Corporation, Ridgefield, CT (US)

( * ) Notice: Subject to any disclaimer, the term of this patent is extended or adjusted under 35 U.S.C. 154(b) by 141 days.

(21) Appl. No.: 10/233,355

(22) Filed: Dec. 16, 2002

(65) Prior Publication Data

US 2004/0114849 A1 Jun. 17, 2004

(51) Int. Cl.[7] .............................. G02B 6/00; G01J 1/04; G01J 1/42
(52) U.S. Cl. ...................... 385/13; 385/12; 250/227.14; 250/227.17; 250/227.18; 340/555; 340/556; 73/861.42; 73/861.46; 73/861.47
(58) Field of Search ............................. 385/12, 13, 37, 385/147; 250/227.14, 227.17, 227.18; 340/555–557; 73/1.56–1.57, 37, 861.42, 861.45, 861.46, 861.47

(56) References Cited

U.S. PATENT DOCUMENTS

| | | | | |
|---|---|---|---|---|
| 4,360,247 A | | 11/1982 | Beasley | 350/96.15 |
| 5,084,615 A | * | 1/1992 | Tracey | 250/227.16 |
| 5,380,995 A | | 1/1995 | Udd et al. | 250/227.18 |
| 5,841,131 A | | 11/1998 | Schroeder et al. | 250/227.17 |
| 6,218,661 B1 | * | 4/2001 | Schroeder et al. | 250/227.14 |
| 6,304,686 B1 | * | 10/2001 | Yamate et al. | 385/13 |
| 6,363,180 B1 | | 3/2002 | Yamate et al. | 385/12 |
| 6,563,970 B1 | * | 5/2003 | Bohnert et al. | 385/13 |
| 6,668,656 B2 | * | 12/2003 | Fernald et al. | 73/705 |
| 6,740,866 B1 | * | 5/2004 | Bohnert et al. | 250/227.14 |

FOREIGN PATENT DOCUMENTS

| | | | | |
|---|---|---|---|---|
| JP | 7306109 | | 11/1995 | G01L/23/22 |
| JP | 11218458 | | 8/1999 | G01L/11/02 |

* cited by examiner

*Primary Examiner*—Brian Healy
*Assistant Examiner*—Kevin S. Wood
(74) *Attorney, Agent, or Firm*—David P. Gordon; William B. Batzer; John J. Ryberg

(57) ABSTRACT

A multiple mode pre-loadable fiber optic pressure and temperature sensor includes a generally cylindrical structure having at least one compression element, a fiber optic having a Bragg grating in contact with one side of the compression element, a diaphragm in contact with the other side of the compression element, and a fluid port in fluid communication with the diaphragm. According to preferred aspects of the, a groove is provided in at least one compression element for receiving the fiber optic. The sensor is pre-loaded by straining the diaphragm over the adjacent compression element when the cover is attached. The compression element in contact with the diaphragm preferably has a contoured surface contacting the diaphragm and the diaphragm is stretched to match that contour. By varying the contour of the compression element and the thickness of the diaphragm, the dynamic range of the sensor can be changed. The preferred diaphragm has a variable thickness and is made as an integral part of the structure. The sensor can be operated in normal, reverse, or differential mode.

26 Claims, 11 Drawing Sheets

MULTIPLE MODE PRE-LOADABLE FIBER OPTIC PRESSURE AND TEMPERATURE SENSOR

This application is related to U.S. Pat. No. 6,304,686 issued Oct. 16, 2001 to Yamate et al. for "Methods And Apparatus for Measuring Differential Pressure with Fiber Optic Sensor Systems", the complete disclosure of which is hereby incorporated by reference herein.

This application is also related to U.S. Pat. No. 6,218,661 issued Apr. 17, 2001 to Schroeder et al. for "Methods and Apparatus for Mechanically Enhancing the Sensitivity of Transversely Loaded Fiber Optic Sensors", the complete disclosure of which is hereby incorporated by reference herein.

This application is also related to U.S. Pat. No. 5,841,131 issued Nov. 24, 2001 to Schroeder et al. for "Fiber Optic Pressure Transducers and Pressure Sensing System Incorporating Same," the complete disclosure of which is hereby incorporated by reference herein.

This application is also related to U.S. Pat. No. 6,363,180 Issued Mar.26, 2002 to Yamate et al. for "Methods and Apparatus for Enhancing Dynamic Range, Sensitivity, Accuracy, and Resolution in Fiber Optic Sensor Systems This invention was made with government support under Contract Number N00024-00-C-4052 awarded by the Department of the Navy. The U.S. government has certain rights in the invention.

BACKGROUND OF THE INVENTION

1. Field of the Invention

The invention-relates to fiber optic sensor systems. More particularly, the invention relates to a fiber optic sensor housing which is capable of introducing a desired initial pre-load. The housing arrangement allows for low pressure response in a fiber optic Bragg grating.

2. State of the Art

Fiber optic sensor technology has developed concurrently with fiber optic telecommunication technology. The physical aspects of optical fibers which enable them to act as wave guides for light are affected by environmental influences such as temperature, pressure, and strain. These aspects of optical fibers which may be considered a disadvantage to the telecommunications industry are an important advantage to the fiber optic sensor industry.

Optical fibers, whether used in telecommunications or as environmental sensors, generally include a cylindrical core, a concentric cylindrical cladding surrounding the core, and a concentric cylindrical protective jacket or buffer surrounding the cladding. The core is made of transparent glass or plastic having a certain index of refraction. The cladding is also made of transparent glass or plastic, but having a different, smaller, index of refraction. The ability of the optical fiber to act as a bendable waveguide is largely determined by the relative refractive indices of the core and the cladding.

The refractive index of a transparent medium is the ratio of the velocity of light in a vacuum to the velocity of light in the medium. As a beam of light enters a medium, the change in velocity causes the beam to change direction. More specifically, as a beam of light travels from one medium into another medium, the beam changes direction at the interface of the two media. In addition to changing direction at the interface of two media, a portion of the incident beam is reflected at the interface such that the energy of the beam traveling through the second medium is diminished (the sum of the energy of the refracted and reflected beams must equal the energy of the incident beam). The angles of reflection and refraction can be predicted using Snell's law if the refractive indices of both media are known.

By altering the indices of refraction of two adjacent media, the angle of refraction and the angle of reflection of a beam traveling toward the interface of the two media can be altered such that the intensity of the light entering the second medium approaches zero and substantially all of the light is reflected at the interface. Conversely, for any two transparent media, there is a critical angle of incidence at their interface at or below which substantially all of the incident light will be reflected. This phenomenon, known as total internal reflection, is applied in choosing the refractive indices of the core and the cladding in optical fibers so that light may propagate through the core of the fiber with minimal power loss.

Many other factors affect the propagation of light through the fiber optic core, including the dimensions of the core and the cladding, the wavelength of the light, the magnetic field vectors of the light and electrical field vectors of the light. In addition, many of the physical laws used to determine the ideal propagation of light through a wave guide (optical fiber) assume an "ideal" waveguide, i.e. a straight wave guide with perfect symmetry and no imperfections. For example, the diameter of the core and the wavelength of the light transmitted through it will determine whether the fiber optic is "single mode" or "multimode". The terms single mode and multimode refer to the dimensional orientation of rays propagating through the fiber. Single mode fibers have a core with a relatively small diameter (2–12 microns) and support only one spatial mode of propagation. Multimode fibers have a core with a relatively large diameter (25–75 microns) and permit non-axial rays or modes to propagate through the core. The so-called single mode fibers are actually two mode fibers in the sense that there are two different states of optical polarization that can be propagated through the core. In an ideal, straight, imperfection-free fiber with perfect circular symmetry, the propagation velocity of light is independent of the direction of polarization.

A fiber with an elliptical core will have two preferred directions of polarization (along the major axis and along the minor axis). Linearly polarized light injected into the fiber at any other direction of polarization will propagate in two separate modes that travel at slightly different velocities. This type of fiber is said to have a "modal birefringence". In a real fiber of this type, even ideally polarized light will couple into the other mode due to imperfections in the core-cladding interface, index of refraction fluctuations, and other mechanisms. Static and dynamic changes in polarization may occur along the entire length of the fiber. Over a given distance, the phases of the two modes will pass through an entire cycle of being in phase and out of phase. This distance is known as the "beat length". A long beat length is associated with a small birefringence and a short beat length is associated with a large birefringence. Birefringent optical fibers are also known as "polarization preserving fibers" or "polarization maintaining (PM) fibers". Birefringence is achieved by providing a core with an elliptical cross section or by providing circular core with a cladding which induces stress on the core. For example, the cladding may be provided with two parallel stress members having longitudinal axes which lie in the same plane as the axis of the core.

As mentioned above, fiber optic sensors employ the fact that environmental effects can alter the amplitude, phase, frequency, spectral content, or polarization of light propagated through an optical fiber. The primary advantages of fiber optic sensors include their ability to be light weight, very small, passive, energy efficient, rugged, and immune to electromagnetic interference. In addition, fiber optic sensors have the potential for very high sensitivity, large dynamic range, and wide bandwidth. Further, a certain class of fiber optic sensors may be distributed or multiplexed along a length of fiber. They may also be embedded into materials.

State of the art fiber optic sensors can be classified as either "extrinsic" or "intrinsic". Extrinsic sensors rely on some other device being coupled to the fiber optic in order to translate environmental effects into changes in the properties of the light in the fiber optic. Intrinsic sensors rely only on the properties of the optical fiber in order to measure ambient environmental effects. Known fiber optic sensors include linear position sensors, rotational position sensors, fluid level sensors, temperature sensors, strain gauges, fiber optic gyroscopes, and pressure sensors.

One type of fiber optic pressure sensor takes advantage of the fact that ambient pressure places a strain on the jacket of an optical fiber which strains the cladding, thereby straining the core and changing the birefringence of the fiber. When a force is applied transversely to the fiber, the birefringence of the fiber changes, which changes the beat length and thus the intensity of light viewed by an intensity detector. Another type of fiber optic sensor utilizes intra-core Bragg fiber gratings as disclosed in U.S. Pat. No. 5,380,995 to Udd et al., the complete disclosure of which is incorporated by reference herein. Intra-core Bragg gratings are formed in a fiber optic by doping an optical fiber with material such as germania and then exposing the side of the fiber to an interference pattern to produce sinusoidal variations in the refractive index of the core. Two presently known methods of providing the interference pattern are by holographic imaging and by phase mask grating. Holographic imaging utilizes two short wavelength (usually 240 nm) laser beams which are imaged through the side of a fiber core to form the interference pattern. The bright fringes of the interference pattern cause the index of refraction of the core to be "modulated" resulting in the formation of a fiber grating. Similar results are obtained using short pulses of laser light, writing fiber gratings line by line through the use of phase masks. By adjusting the fringe spacing of the interference pattern, the periodic index of refraction can be varied as desired. Another method of writing the grating on the fiber is to focus a laser through the side of the fiber and write the grating one line at a time. Specialized fiber Bragg grating sensors can also be made from this process. These sensors include side air hole fibers with Bragg gratings, polarization fibers (PM) with gratings, long period gratings, pi-shifted gratings, chirped gratings, and gratings inside of holey fibers.

When a fiber optic is provided with a grating and subjected to transverse strain, two spectral peaks are produced (one for each polarization axis) and the peak to peak separation is proportional to the transverse strain. Spectral demodulation systems such as tunable Fabry-Perot filters, acousto-optical filters, interferometers, or optical spectrum analyzers coupled to the fiber detect the two spectral outputs. The spectral outputs are analyzed and the transverse strain is determined by measuring the peak to peak separation. Depending on how the fiber optic is deployed, the transverse strain may be related to temperature, pressure, or another environmental measure.

There are two shortcomings of this type of sensor system. First, dual peaks are only discernable in ordinary single mode fiber when there is considerable transverse strain, e.g. at very high pressure. Various structures are known for mechanically influencing the fiber such that isotropic forces are converted to anisotropic forces to produce birefringence and to magnify the effect of transverse strain on birefringence. Exemplary structures are disclosed in previously incorporated U.S. Pat. No. 5,841,131 and U.S. Pat. No. 6,218,661. Nevertheless, these mechanical structures can only do so much to enhance the sensitivity of fiber optic sensors.

Previously incorporated U.S. Pat. No. 6,363,180 discloses methods for enhancing dynamic range, sensitivity, accuracy, and resolution in fiber optic sensors which include manipulating the polarization characteristics of the light entering a fiber optic sensor and/or manipulating the polarization characteristics of the light exiting the sensor before it enters the light detection system. While these methods are effective, they do require additional equipment.

Most of the known structures used to enhance the sensitivity of fiber optic pressure sensors suffer from several disadvantages. They often require complicated construction with many parts. They react adversely to thermal changes. They are relatively large. They require the use of an o-ring which reacts adversely to high temperature. They only operate in one mode. By one mode, it is meant that the sensor operates either in a forward mode, a reverse mode, or a differential mode. In a forward mode, increased pressure causes increased strain on the fiber optic. In a reverse mode, increased pressure causes a decrease in the strain on the fiber optic. In a differential mode, the fiber optic is exposed to two different pressures and the strain on the fiber optic is indicative of the difference between the pressures. It will be appreciated that it would be desirable to provide a sensor which operates in multiple modes. Thus, as used herein, the term "multiple mode" refers to a fiber optic sensor which can operate in multiple modes and should not be confused with the term "multimode" used above to refer to a particular type of fiber optic.

SUMMARY OF THE INVENTION

It is therefore an object of the invention to provide a multiple mode pre-loadable fiber optic pressure and temperature sensor.

It is also an object of the invention to provide a multiple mode pre-loadable fiber optic pressure and temperature sensor which has a simplified construction requiring few pieces.

It is another object of the invention to provide a multiple mode pre-loadable fiber optic pressure and temperature sensor which is relatively small in size.

It is still another object of the invention to provide a multiple mode pre-loadable fiber optic pressure and temperature sensor which performs well at low pressures (near atmospheric pressure) and high temperatures.

It is also an object of the invention to provide a multiple mode pre-loadable fiber optic pressure and temperature sensor which has a very uniform dual peak performance.

It is another object of the invention to provide a multiple mode pre-loadable fiber optic pressure and temperature sensor which can measure atmospheric pressure without the need for altering the polarization characteristics of light entering or exiting the fiber.

It is still another object of the invention to provide a multiple mode pre-loadable fiber optic pressure and temperature sensor which operates with very little hysteresis and has high long term stability.

In accord with these objects which will be discussed in detail below, the multiple mode pre-loadable fiber optic pressure and temperature sensor of the present invention includes a generally cylindrical structure having at least one compression element, a fiber optic having a Bragg grating in contact with one side of the compression element, a diaphragm in contact with the other side of the compression element, and a fluid port in fluid communication with the diaphragm. All of the components are preferably made of Super Invar which has a coefficient of thermal expansion (CTE) similar to that of glass/quartz fiber optic material. (Invar is a registered trademark of Imphy S.A. Corporation, assignee of Ste. Ame. de Commentry Fourchambault et Decazeville Corporation, France No. 16 Place Vendome, Paris, France for an alloy having a very low CTE. Super Invar is not a registered trademark and is generally used as a designation for an iron-nickel-cobalt alloy having a very low CTE.)

According to a first embodiment, a fiber optic having a Bragg grating is placed between two compression elements in a substantially cylindrical structure. The structure is covered with a cover including a diaphragm and a pressure port. The diaphragm contacts one of the compression elements. According to this embodiment, the diaphragm is integrally formed with the cover forming a pressure chamber between it and the pressure port. The cover is coupled to the generally cylindrical structure with two bolts.

According to a second and presently preferred embodiment, a diaphragm is integrally formed with the interior of a substantially cylindrical member creating a pressure chamber and a pressure port is provided in fluid communication with the pressure chamber. A single compression element is placed on top of the diaphragm and a fiber optic with a Bragg grating is placed on top of the compression element. A cover is placed over the fiber optic and is laser welded to the substantially cylindrical member.

According to preferred aspects of the invention that apply to both embodiments, a groove is provided in at least one compression element for receiving the fiber optic. In both embodiments, the sensor is pre-loaded by straining the diaphragm over the adjacent compression element when the cover is attached. The compression element in contact with the diaphragm preferably has a contoured surface contacting the diaphragm and the diaphragm is deformed to match that contour. By changing the contour of the compression element and the thickness of the diaphragm, the dynamic range of the sensor can be changed. : The cross-section of the diaphragm is designed such that it remains under uniform stress at each location. For example, under a uniformly distributed pressure within the chamber, a diaphragm having a constant thickness would experience a particular distribution of bending moment and shear forces. According to one aspect of the invention, the section modulus of the thickness of the diaphragm is varied such that the stress induced in the diaphragm remains uniform. This design allows the diaphragm to be stretched a higher degree than would otherwise be possible if the stress distribution were non-uniform. Consequently, the diaphragm can remain within its elastic range under a larger pressure range, thus increasing the operating range of the sensor.

Both embodiments can be operated in multiple modes. In the "normal" operating mode, the housing design allows sensing of fluid pressure in an isolated chamber adjacent to the pre-strained diaphragm. The pre-strain in the diaphragm creates a corresponding pre-load on the fiber optic sensing element. In the "reverse" mode, a pressure chamber is located on the same side of the diaphragm as the compression element(s) such that the pressure in the pressure chamber reduces the initial pre-load. The housing design also allows sensing the pressure in a "differential" mode, by providing pressure chambers on both sides of the diaphragm. In this mode, a change in the pre-load measured by the sensing element indicates a difference in the pressure between the two fluids.

According to the second and presently preferred embodiment, the cover has a surface that curves in two substantially orthogonal directions. During manufacture, one or more collars are slid over the structure to hold the cover in place during welding. Due to the surface curvature of the cover, movement of the collar(s) toward the center of the cover increases the pre-load.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
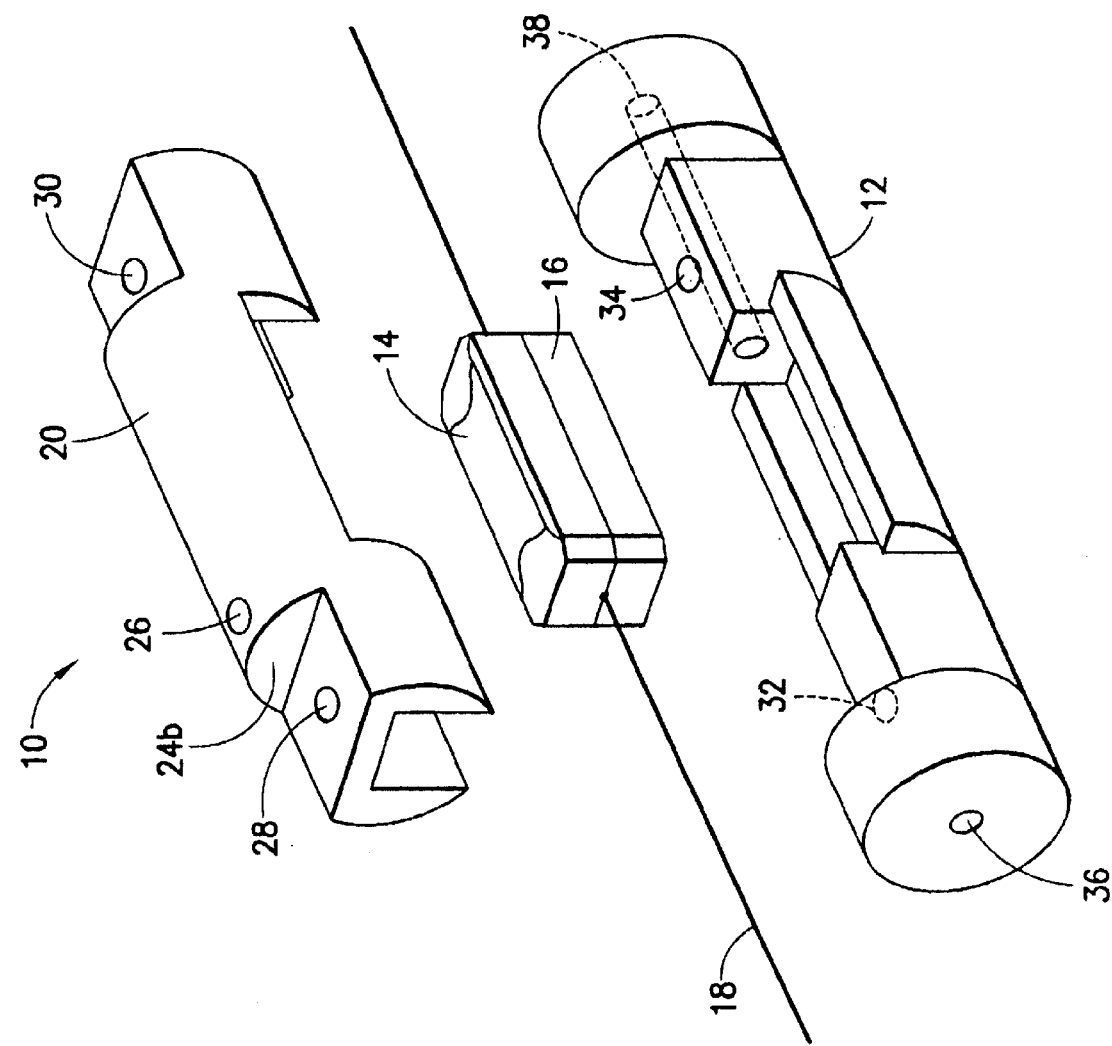
FIG. 1 is an exploded perspective view of a first embodiment of a sensor according to the invention.

Referring now to FIGS. 1 through 4, a first embodiment of a multiple mode pre-loadable fiber optic pressure and temperature sensor 10 according to the invention includes a generally cylindrical structure 12, two compression elements 14, 16, a fiber optic having a Bragg grating 18, and a cover 20.

Figure 2:
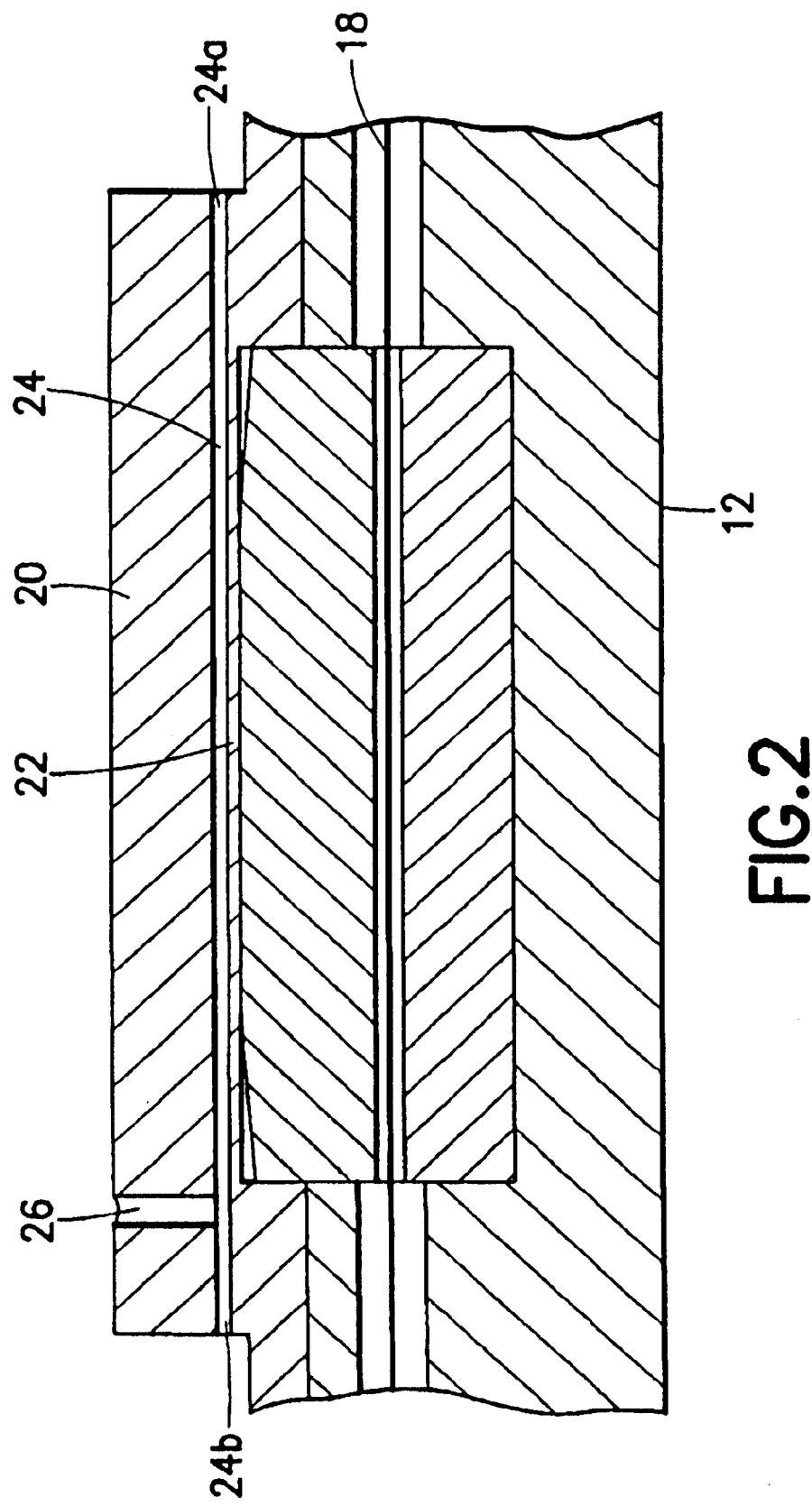
FIG. 2 is an enlarged cut-away side view of the first embodiment.
Figure 3:
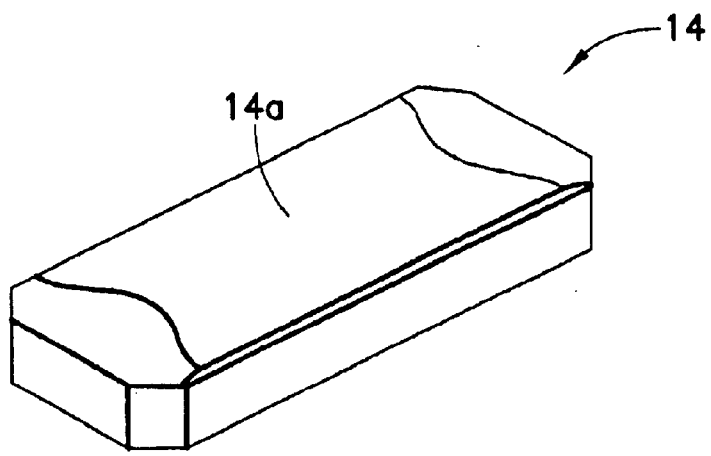
FIG. 3 is a perspective view of a compression element.
Figure 4:
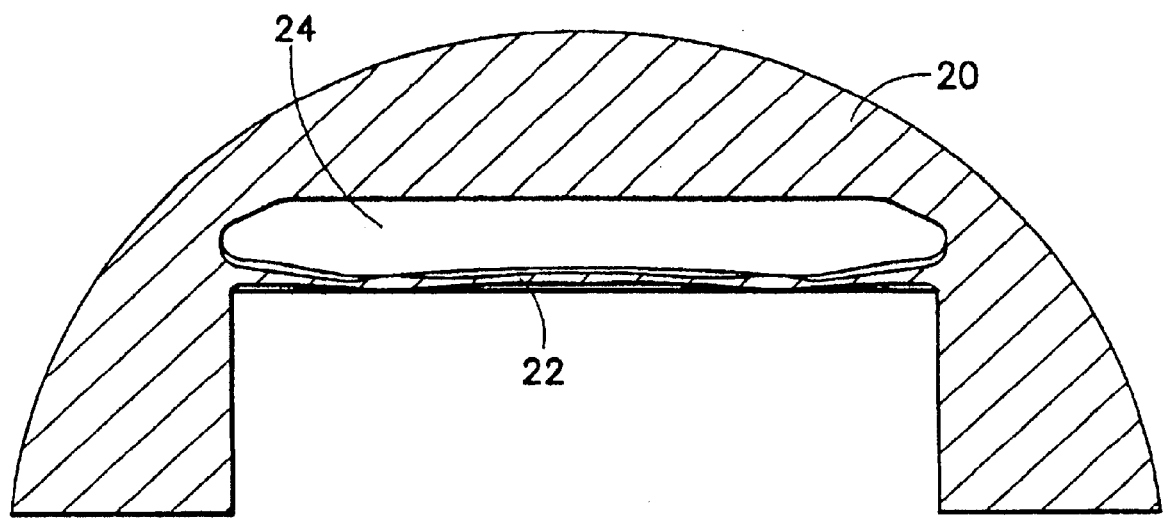
FIG. 4 is a broken enlarged sectional view illustrating the diaphragm of the first embodiment.

As seen best in FIGS. 2 and 4, the cover 20 has a diaphragm 22 integrally formed with it, thus defining a pressure chamber 24. As seen in FIGS. 1 and 2, the pressure chamber 24 has two open ends 24a, 24b which are welded shut and a pressure port bore 26 is provided substantially orthogonal to the diaphragm 22.

As seen best in FIG. 1, the cover 20 is provided with two bolt holes 28, 30 for receiving bolts (not shown). The cylindrical structure 12 has threaded holes 32, 34 for receiving the bolts (not shown) and has a longitudinal through bore 36, 38 for receiving the fiber optic 18.

The sensor 10 is assembled by placing the lower compression element 16 in the cylindrical structure 12, threading the fiber optic 18 through the through bore 36, 38 so that its Bragg grating (not shown) is located on top of the compression element 16, placing the upper compression element 14 on top of the fiber optic, aligning the cover 20 over the assembly, and bolting the cover to the cylindrical member.

According to this embodiment of the invention, the upper surface 14a of the upper compression element 14 (FIG. 3) and the morphology of the diaphragm 22 (FIG. 4) are designed such that when the cover 10 is bolted down, the diaphragm is pressed against the compression element 14 causing a pre-loading of the fiber optic sensor.

According to the presently preferred embodiments, all of the components are preferably made of Super Invar which has a coefficient of thermal expansion similar to that of glass/quartz fiber optic material.

Figure 5:
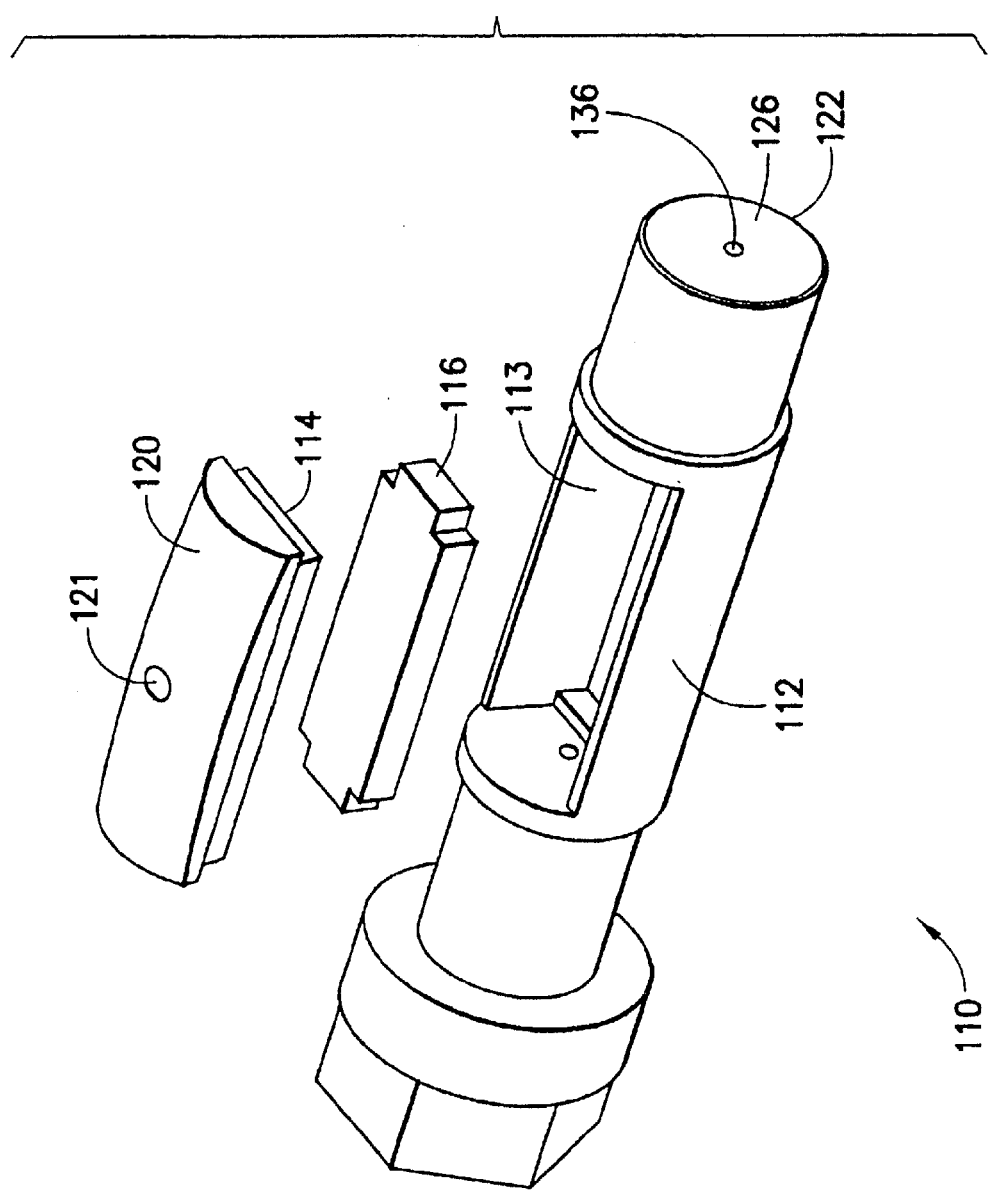
FIG. 5 is an exploded perspective view of a second embodiment of a sensor according to the invention.
Figure 6:
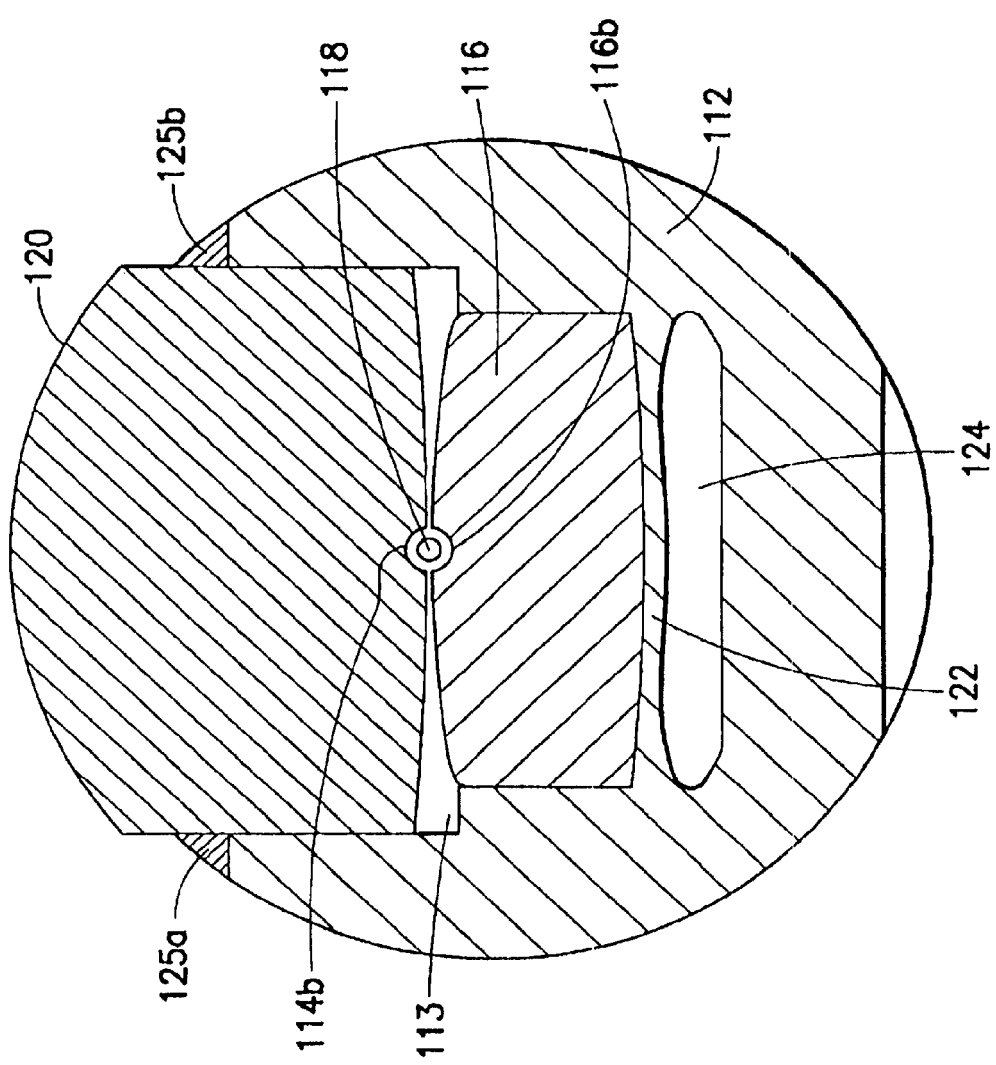
FIG. 6 is an enlarged cross-sectional view of the second embodiment.

Referring now to FIGS. 5 and 6, a second and presently preferred embodiment is disclosed. The sensor 110 is similar to the sensor 10 and is referred to in the figures with similar reference numerals (increased by 100) referring to similar parts. Thus, the sensor 110 includes a substantially cylindrical member 112, a lower compression element 116, a fiber optic 118, and a cover 120. According to this embodiment, the upper compression element 114 is actually a part of the cover 120, thereby reducing the total number of parts.

The lower cylindrical member 112 has a through bore 136 and a stepped rectilinear opening 113 into which the remaining parts are placed. As seen best in FIG. 6, a diaphragm 122 in the lower cylindrical member 112 forms a longitudinal pressure chamber 124. The lower compression element 116 is placed on top of the diaphragm 122. The fiber optic 118 is threaded through the through bore 136 (FIG. 5) and is located with its Bragg grating (not shown) on top of the compression element 116. The cover 120 is then placed on top of the other parts as seen best in FIG. 6. The cover 120 is pressed down until the fiber optic 118 is pre-loaded to the desired amount and then is welded in place with two longitudinal welds 125a, 125b. The pressure chamber 120 is sealed at opposite ends and a pressure port 126 is coupled to it.

Figure 7:
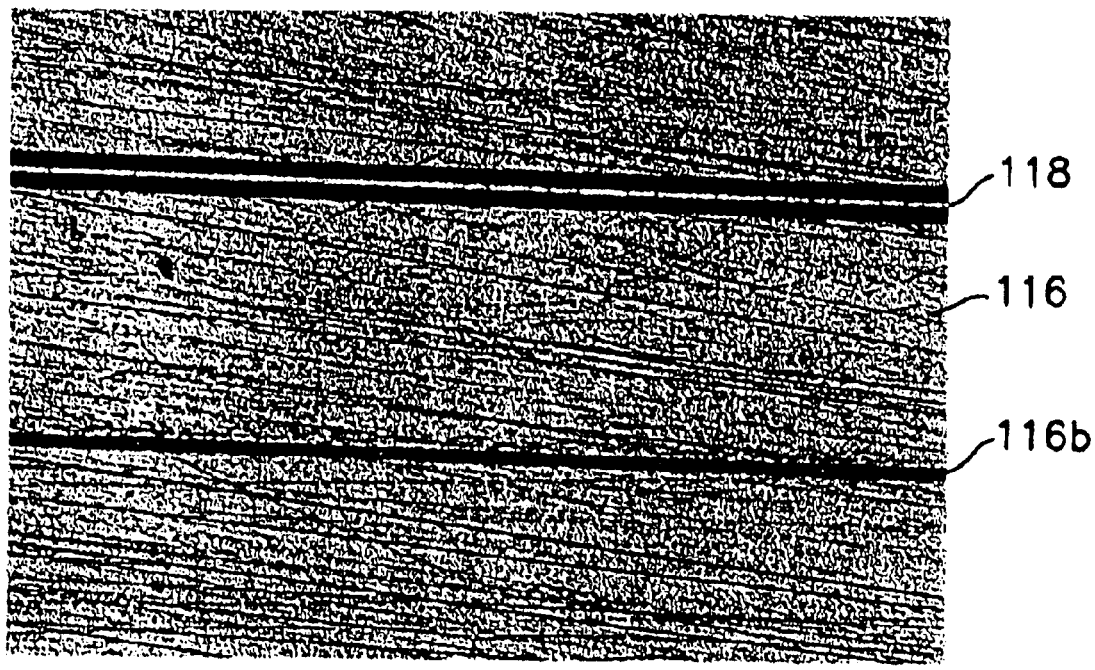
FIG. 7 is an enlarged photograph of one of the compression elements illustrating the preferred groove and showing a fiber optic next to the groove to compare dimensions.

According to preferred aspects of the invention that apply to both embodiments, a groove (e.g., 114b, 116b in FIG. 6) is provided in at least one of the compression element for receiving the fiber optic 118 (18). A suitable groove 116b is also illustrated in FIG. 7 with the fiber optic 118 placed alongside it for size comparison.

According to a presently preferred embodiment, the fiber optic 118 has a diameter of approximately 125 microns and the grooves 114b, 116b has a diameter of approximately 97 microns. Preferably, the groove has a cross section which is less than a full semi-circle. FIG. 7 also illustrates that the surface finish of the compression elements is not critical.

Figure 8:
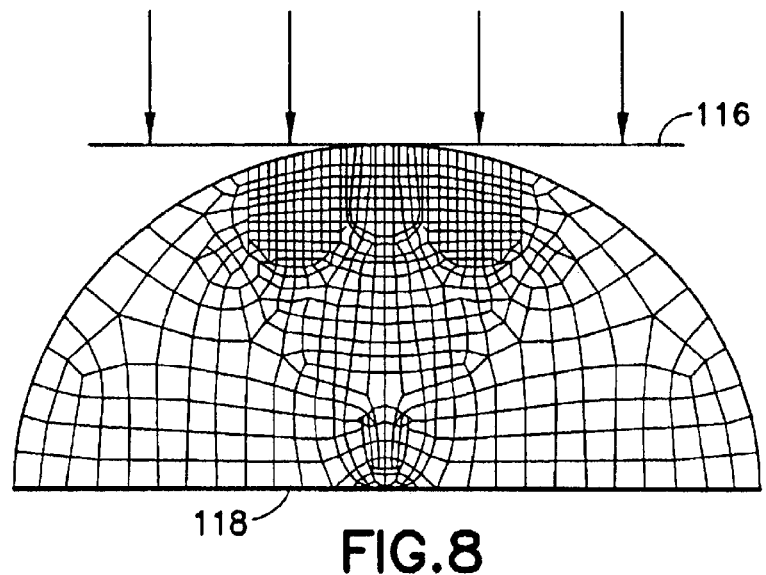
FIG. 8 illustrates the transfer of pressure from the diaphragm to the fiber optic core in the absence of a grooved pressure element.
Figure 9:
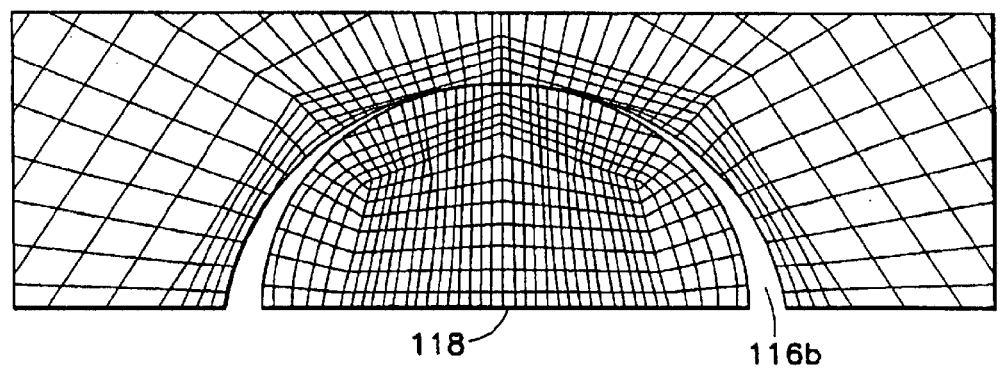
FIG. 9 illustrates the transfer of pressure from the diaphragm to the fiber optic core in the presence of a grooved pressure element.

FIGS. 8 and 9 illustrate the difference in the forces acting on a fiber optic 118 without a groove in the compression member and with a groove in the compression member. As shown in FIG. 8, when a flat compression member without a groove is used, the strain on the fiber optic is tangential to the cladding at a small point. However, the differential strain is made at the fiber core 118. As shown in FIG. 9, the presence of the groove causes the strain to spread out over a larger area, inside the cladding, but still producing the resulting differential strain at the core 118.

Figure 10:
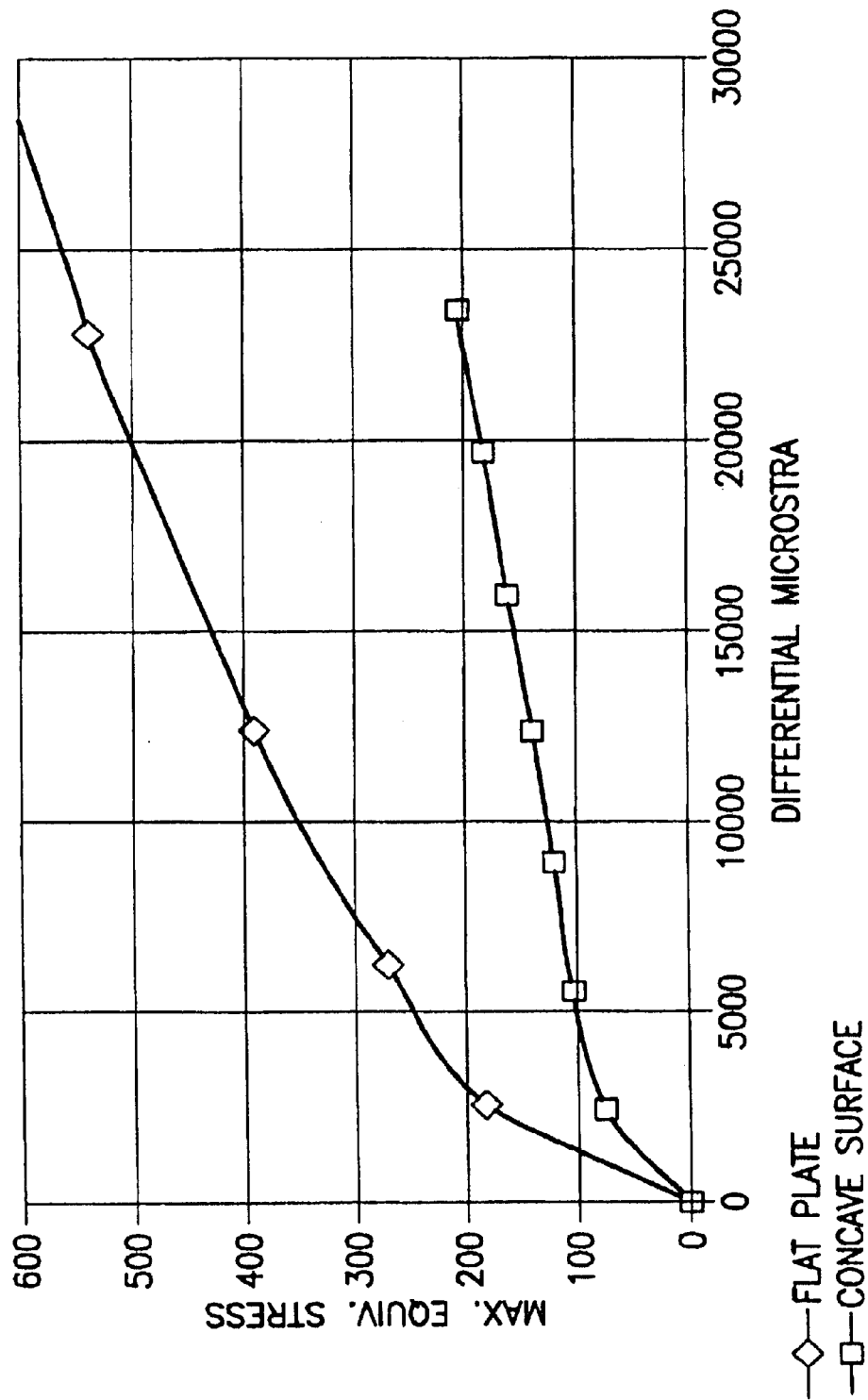
FIG. 10 is a graph illustrating the effects of the grooves on the dynamic range of the sensor.

The results of the groove are also illustrated in FIG. 10 which compares the flat compression element shown in the upper curve and the grooved compression element shown in the lower curve. In FIG. 10, the strain exerted on the cladding of the fiber optic is indicated on the Y-axis and the resulting differential strain exerted on the core is indicated on the x-axis. The groove allows the fiber core to be prestressed to a much greater degree than otherwise, possible. Without the groove, the strain required on the cladding to obtain the same amount of prestressing of the core point could break the fiber cladding. The groove in the compression plate can be manufactured or made in situ by the fiber itself via exercising the compression plates with an external strain or pressure.

Figure 11:
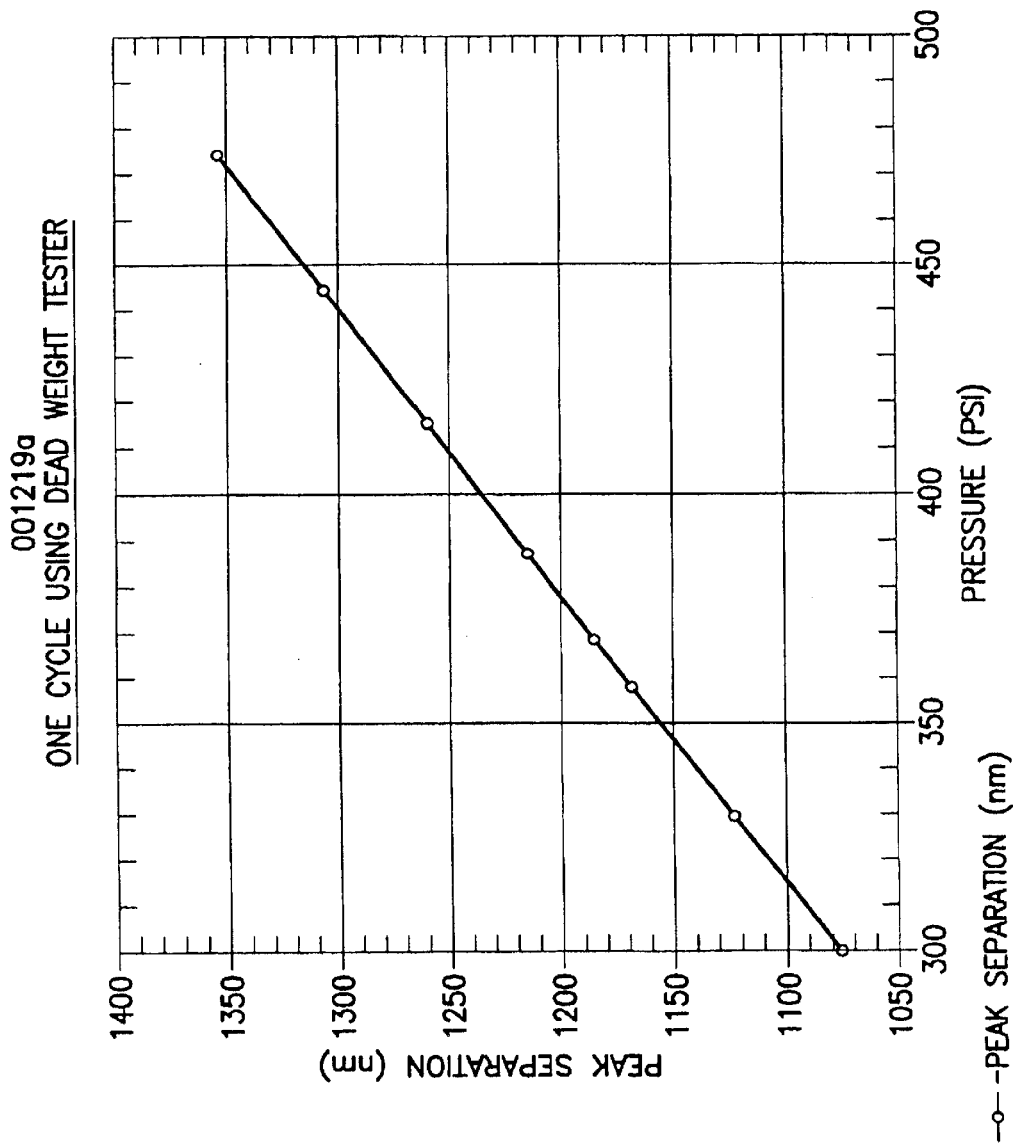
FIG. 11 is a graph illustrating the sensitivity of a sensor according to the invention.

FIG. 11 illustrates the sensitivity and linear performance of the sensors of the invention in the range of 300–500 psi.

As mentioned above, both embodiments can be operated in multiple modes. The Figures described thusfar illustrate the "normal" operating mode, where the housing design allows sensing of fluid pressure in an isolated chamber adjacent to the pre-strained diaphragm. The pre-strain in the diaphragm creates a corresponding pre-load on the fiber optic sensing element.

Referring back to FIG. 6, the sensor can be operated in reverse mode by pressurizing the chamber 113. In the "reverse" mode, the pressure in the chamber 113 reduces the initial pre-load of the diaphragm 122. The reverse mode is useful when measuring changes in extremely high pressures. In this case, the initial pre-load is brought to a very high level, near the highest desired pressure measurement point, and the pressure chamber 113 reduces the strain on the fiber. The result is a high pressure measurement with low strain on the fiber. By pressurizing the interior of the housing, the stress on the diaphragm and thus the fiber optic is greatly reduced and the external pressure is in effect attenuated.

Figure 12:
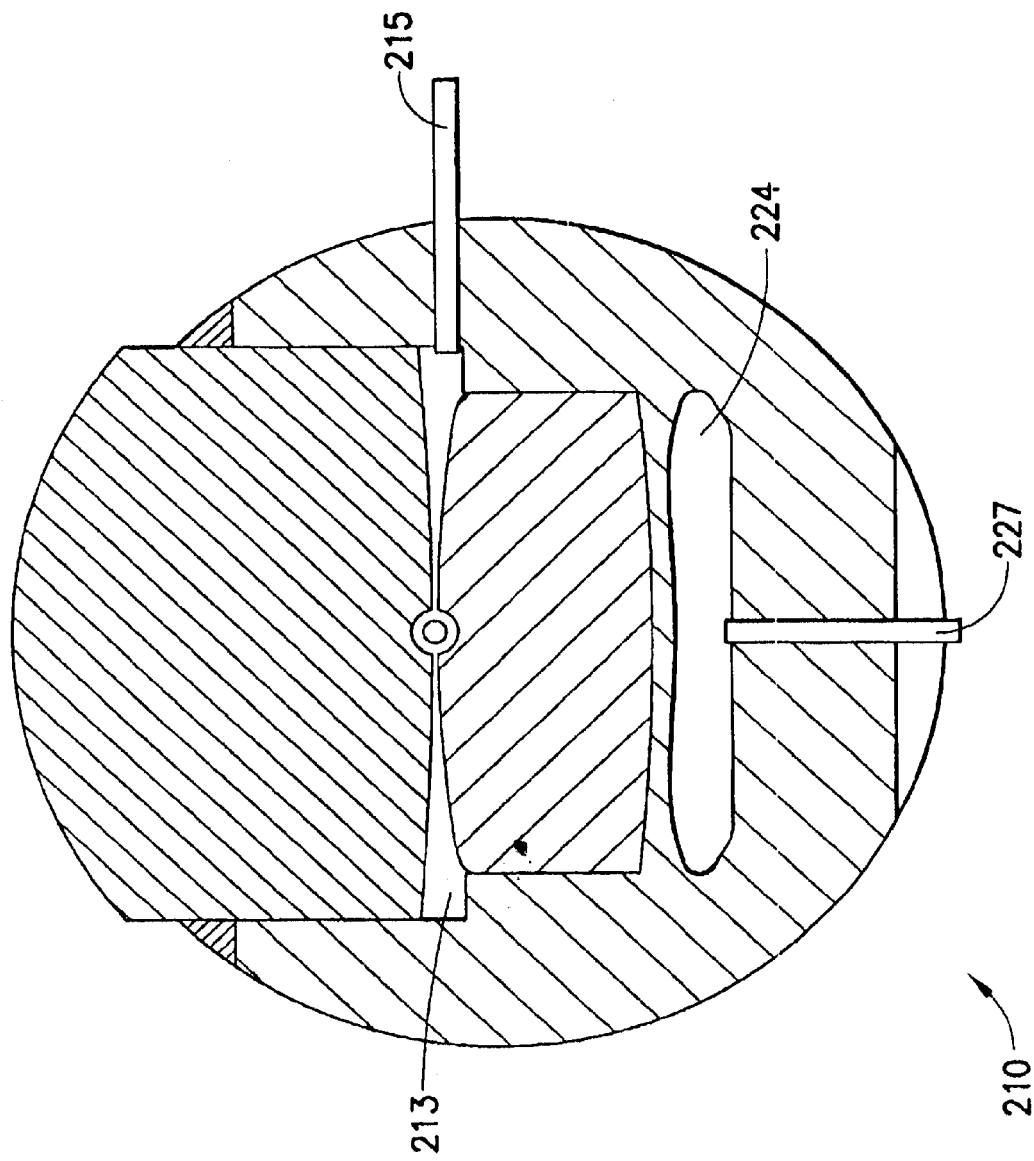
FIG. 12 is a view similar to FIG. 6 illustrating a differential mode sensor.

The housing design also allows sensing the pressure in a "differential" mode, by providing pressure chambers on both sides of the diaphragm. FIG. 12 illustrates a sensor 210 which operates in differential mode. The pressure chamber 213 is provided with a pressure port 215 and the pressure chamber 224 is also provided with a pressure port 227. In this mode, a change in the pre-load measured by the sensing element indicates a difference in the pressure between the two fluid ports 215 and 217.

Those skilled in the art will appreciate that the sensors described herein can be used to sense temperature as well as pressure using the techniques described in the previously incorporated U.S. Pat. No. 6,218,661 and U.S. Pat. No. 5,841,131.

The sensors according to the invention have a lower piece count as compared the sensors of the previously incorporated '661 patent. They are much smaller in size, e.g. 0.5"×2" as compared to 3"×4". The absence of an o-ring provides better performance in high temperatures. The design of the diaphragm and the adjacent compression element can be optimized for different pressure ranges, e.g. high pressures or low pressures. In general, the greater the surface area contact between the diaphragm and the compression element, the more sensitive the sensor. The initial offset of the diaphragm provides a very uniform two peak performance with a Bragg grating and can detect pressures on the order of one atmosphere. Enhanced performance is obtained through the use of a groove on one or both compression elements. In particular, the groove facilitates alignment of the parts and decreases hysteresis in operation.

The presently preferred embodiment is approximately 2.5" long and has a diameter of approximately 0.55". The presently preferred compression element has an overall length of approximately 1.15", an overall width of approximately 0.316" and an overall thickness of approximately 0.127".

Figure 13:
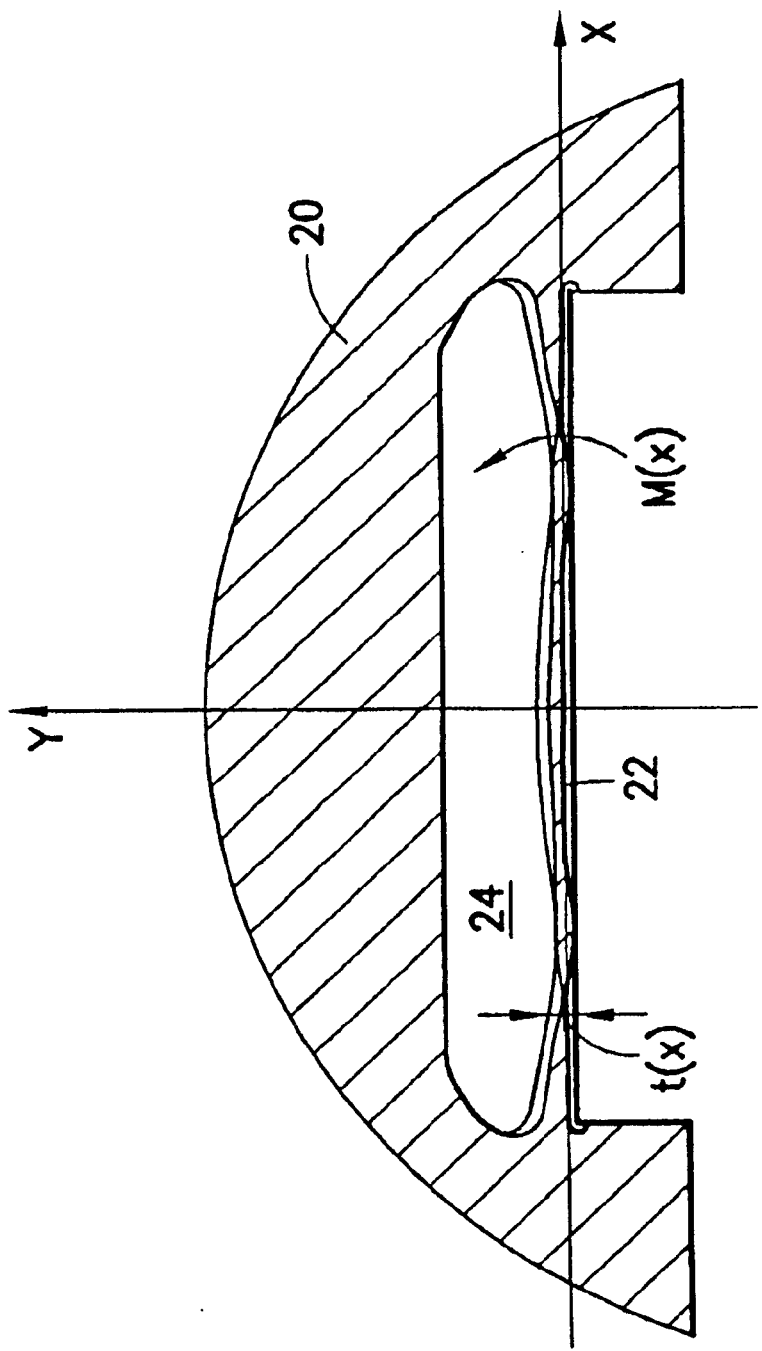
FIG. 13 is a view similar to FIG. 4 illustrating preferred aspects of the diaphragm of the invention.

Referring now to FIG. 13, the presently preferred diaphragm 22 has a variable thickness rather than a constant thickness. Varying the thickness of the diaphragm appropriately results in the storage of maximum strain energy. This results in maximizing the linear deflection range which enhances the linearity and pressure range of the sensor.

As shown in FIG. 13, when a constant pressure fluid is in the pressure chamber 24, the bending moment M(x) at a location x along the diaphragm will vary. Moreover, the stress σ(x) on the diaphragm at location x is a function of bending moment M(x) and the section modulus S(x) as illustrated in Equation (1).

$$\sigma(x) = \frac{M(x)}{S(x)} \quad (1)$$

The section modulus is a function of the thickness as shown in Equation 2 where $K_1$ is a constant and t(x) is the thickness at location x.

$$S(x) = K_1 * [t(x)]^2 \quad (2)$$

Substituting Equation (2) into Equation (1) yields Equation (3) where $K_2$ is the reciprocal of $K_1$.

$$\sigma(x) = \frac{M(x)}{K_1 * t(x)^2} = K_2 * \frac{M(x)}{t(x)^2} \quad (3)$$

From the foregoing, it will be appreciated that in order to make the stress on the diaphragm, constant, it is necessary to vary the thickness as a quadratic function of the bending moment.

There have been described and illustrated herein several embodiments of a multi-mode, pre-loadable, pressure and temperature sensor. While particular embodiments of the invention have been described, it is not intended that the invention be limited thereto, as it is intended that the invention be as broad in scope as the art will allow and that the specification be read likewise. Thus, while particular preferred materials have been disclosed, it will be appreciated that other materials could be utilized. Also, while a substantially cylindrical housing has been shown, it will be recognized that other shapes of housings could be used with similar results obtained. Further, while the diaphragm is preferably an integral part of the body or the cover, it could be a separate piece which is welded in place. It will also be appreciated that different types of Bragg gratings could be used, e.g. a Bragg grating inside a PM fiber, a grating in a side hole fiber, a long period grating, a pi-shifted Bragg grating, a chirped grating, or a Bragg grating inside a holey fiber. The pressure and temperature sensor of the invention is well suited to work with any of these types of gratings. It will therefore be appreciated by those skilled in the art that yet other modifications could be made to the provided invention without deviating from its spirit and scope as so claimed.

What is claimed is:

1. A pressure sensor, comprising:
   a) a fiber optic;
   b) at least one compression element adjacent to said fiber optic; and
   c) a housing enclosing said compression element and said fiber optic,
      said housing including a diaphragm adjacent to said compression element and defining a pressure chamber having a first fluid port whereby fluid entering the pressure chamber exerts pressure on said diaphragm which exerts pressure on said compression element, wherein
      said-diaphragm is sealed to said housing without the use of an o-ring.

2. A pressure sensor according to claim 1, wherein:
   said fiber optic has a Bragg grating adjacent to said compression element.

3. A pressure sensor according to claim 1, wherein:
   said diaphragm is integrally formed with said housing.

4. A pressure sensor according to claim 1, wherein:
   said housing is substantially cylindrical, having a longitudinal axis, and
   said fiber optic is substantially parallel to said longitudinal axis.

5. A pressure sensor according to claim 1, further comprising:
   d) a second compression element arranged with said fiber optic located between said compression elements.

6. A pressure sensor according to claim 1, wherein:
   said diaphragm is pre-loaded against said compression element.

7. A pressure sensor according to claim 1, wherein:
   said compression element has a groove and said fiber optic is aligned with said groove.

8. A pressure sensor according to claim 1, wherein:
   said housing and said compression element are made of Super Invar.

9. A pressure sensor according to claim 1, wherein:
   said housing is pressurized to reduce the pressure exerted by said diaphragm on said compression element.

10. A pressure sensor according to claim 1, wherein:
    said housing is provided with a second fluid port whereby fluid entering said second fluid port exerts pressure on said diaphragm which relieves pressure on said compression element.

11. A pressure sensor, comprising:
    a) a fiber optic;
    b) at least one compression element adjacent to said fiber optic; and
    c) a housing enclosing said compression element and said fiber optic,
       said housing including a diaphragm adjacent to said compression element and defining a pressure chamber having a fluid port whereby fluid entering the pressure chamber exerts pressure on said diaphragm which exerts pressure on said compression element, wherein
       said compression element has a groove and said fiber optic is aligned with said groove.

12. A pressure sensor according to claim 11, wherein:
    said fiber optic has a Bragg grating adjacent to said compression element.

13. A pressure sensor according to claim 11, wherein:
    said diaphragm is integrally formed with said housing.

14. A pressure sensor according to claim 11, wherein:
    said housing is substantially cylindrical, having a longitudinal axis, and
    said fiber optic is substantially parallel to said longitudinal axis.

15. A pressure sensor according to claim 11, further comprising:

d) a second compression element arranged with said fiber optic located between said compression elements.

16. A pressure sensor according to claim 11, wherein:

said diaphragm is pre-loaded against said compression element.

17. A pressure sensor according to claim 11, wherein:

said compression element has a groove and said fiber optic is aligned with said groove.

18. A pressure sensor according to claim 11, wherein:

said housing and said compression element are made of Super Invar.

19. A pressure sensor according to claim 11, wherein:

said housing is pressurized to reduce the pressure exerted by said diaphragm on said compression element.

20. A pressure sensor according to claim 11, wherein:

said housing is provided with a second fluid port whereby fluid entering said second fluid port exerts pressure on said diaphragm which relieves pressure on said compression element.

21. A pressure sensor, comprising:

a) a fiber optic;

b) at least one compression element adjacent to said fiber optic; and c) a housing enclosing said compression element and said fiber optic, said housing including a diaphragm adjacent to said compression element and defining a pressure chamber having a first fluid port whereby fluid entering the pressure chamber exerts pressure on said diaphragm which exerts pressure on said compression element, wherein said diaphragm has a variable thickness.

22. A pressure sensor according to claim 21, wherein:

said thickness of said diaphragm is varied such that said diaphragm experiences a uniform stress when the pressure in the pressure chamber is constant.

23. A pressure sensor according to claim 21, wherein:

the thickness of said diaphragm varies according to a quadratic function.

24. A pressure sensor according to claim 23, wherein:

the bending moment at each point on the diaphragm divided by the square of the thickness of the diaphragm at that point is a constant.

25. A pressure sensor, comprising:

a) a fiber optic;

b) at least one compression element adjacent to said fiber optic; and c) a housing enclosing said compression element and said fiber optic, said housing including a diaphragm adjacent to said compression element and defining a pressure chamber having a first fluid port whereby fluid entering the pressure chamber exerts pressure on said diaphragm which exerts pressure on said compression element, wherein said diaphragm is integral with said housing.

26. A pressure sensor, comprising:

a) a fiber optic;

b) at least one compression element adjacent to said fiber optic; and c) a housing enclosing said compression element and said fiber optic, said housing including a diaphragm adjacent to said compression element and defining a pressure chamber having a first fluid port whereby fluid entering the pressure chamber exerts pressure on said diaphragm which exerts pressure on said compression element, wherein said compression element has a contoured surface facing said diaphragm.

* * * * *